United States Patent
Rogers

[11] 3,761,139
[45] Sept. 25, 1973

[54] VEHICLE BRAKING SYSTEM WITH SPRING APPLIED PARKING BRAKE

[75] Inventor: George W. Rogers, Petersburg, Ill.

[73] Assignee: Allis-Chalmers Corporation, Milwaukee, Wis.

[22] Filed: Mar. 27, 1972

[21] Appl. No.: 238,389

[52] U.S. Cl. .............................. 303/9, 303/21 AF
[51] Int. Cl. ..................... B60t 8/06, B60t 13/00
[58] Field of Search ........................... 303/9, 21 AF

[56] References Cited
UNITED STATES PATENTS

| | | | |
|---|---|---|---|
| 3,272,567 | 9/1966 | Vielmo | 303/9 X |
| 3,285,672 | 11/1966 | Avrea | 303/9 |
| 3,173,653 | 3/1965 | Valentine | 303/9 X |
| 3,294,455 | 12/1966 | Valentine | 303/9 |
| 3,515,438 | 6/1970 | Stevenson et al. | 303/9 |
| 3,650,568 | 3/1972 | Poplawski | 303/9 X |

Primary Examiner—Robert S. Ward, Jr.
Attorney—Charles L. Schwab et al.

[57] ABSTRACT

A tractor-trailer braking system including air operated service brakes for both the tractor and the trailer. A spring operated parking brake on the output shaft of the transmission is provided with restriction means for the exhaust of air from the air powered actuator employed to overcome the parking brake operating spring. This achieves a slow application of the parking brake to allow the service brakes to be applied first to bring the vehicle to a standstill and save wear and tear on the parking brake. A separate reservoir and standard relay valve is provided on the trailer unit for operating the trailer brakes. A pair of series connected air reservoirs are carried on the tractor which are connected to a dual treadle valve with an emergency operating or protection feature whereby the treadle valve will automatically be operated to brake the vehicle whenever the air pressure in the main or lead tank on the tractor is reduced to a predetermined value. A manually operated parking brake valve is interposed in line between the main reservoir and the parking brake air actuator chamber, and the control port of the protection section of the dual treadle valve is connected to the delivery side of the parking brake valve whereby when the parking brake valve is moved to its exhaust position the service brakes will be applied through operation of the protection section of the dual treadle valve to thus bring the vehicle to a standstill prior to application of the aforementioned parking brake.

6 Claims, 3 Drawing Figures

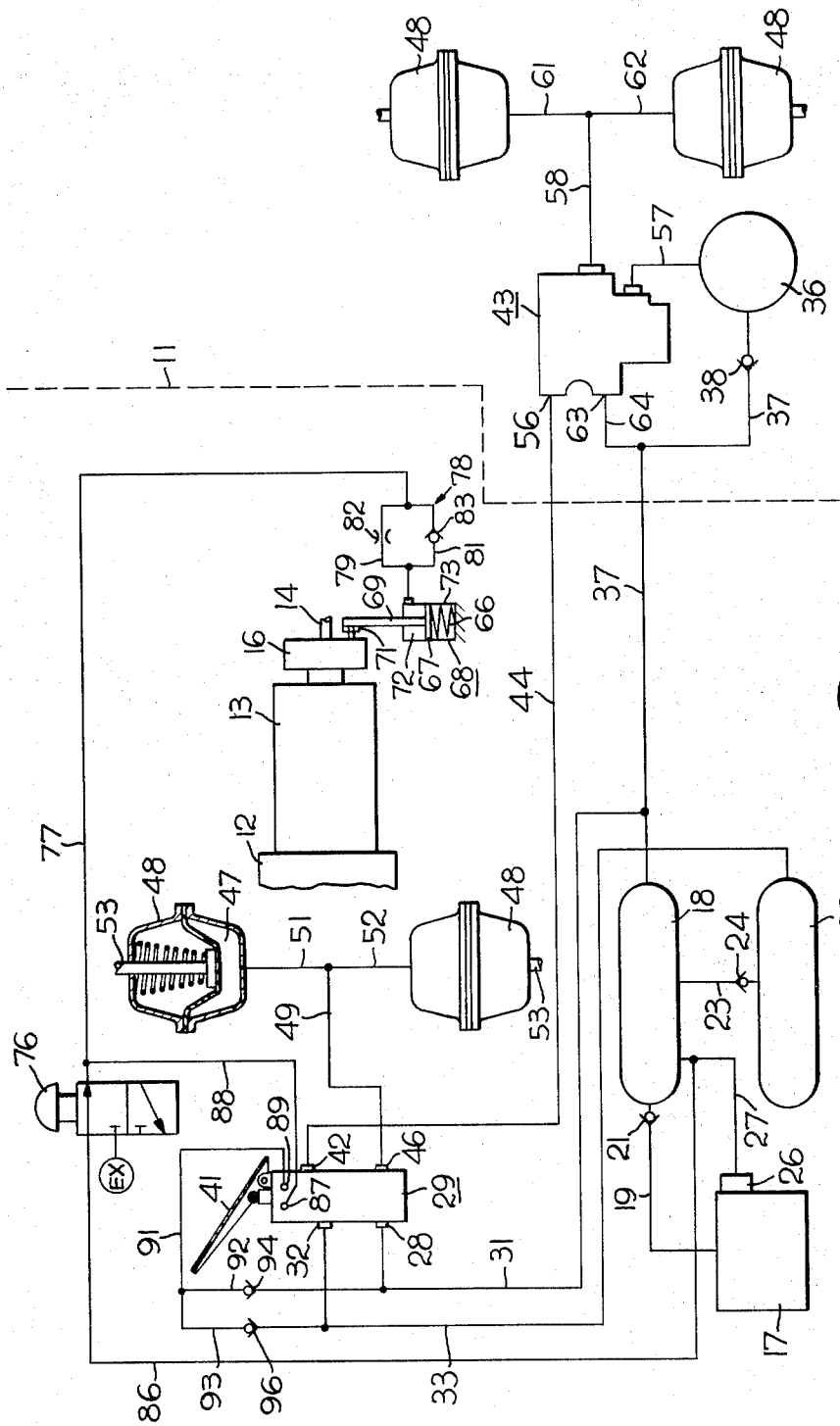

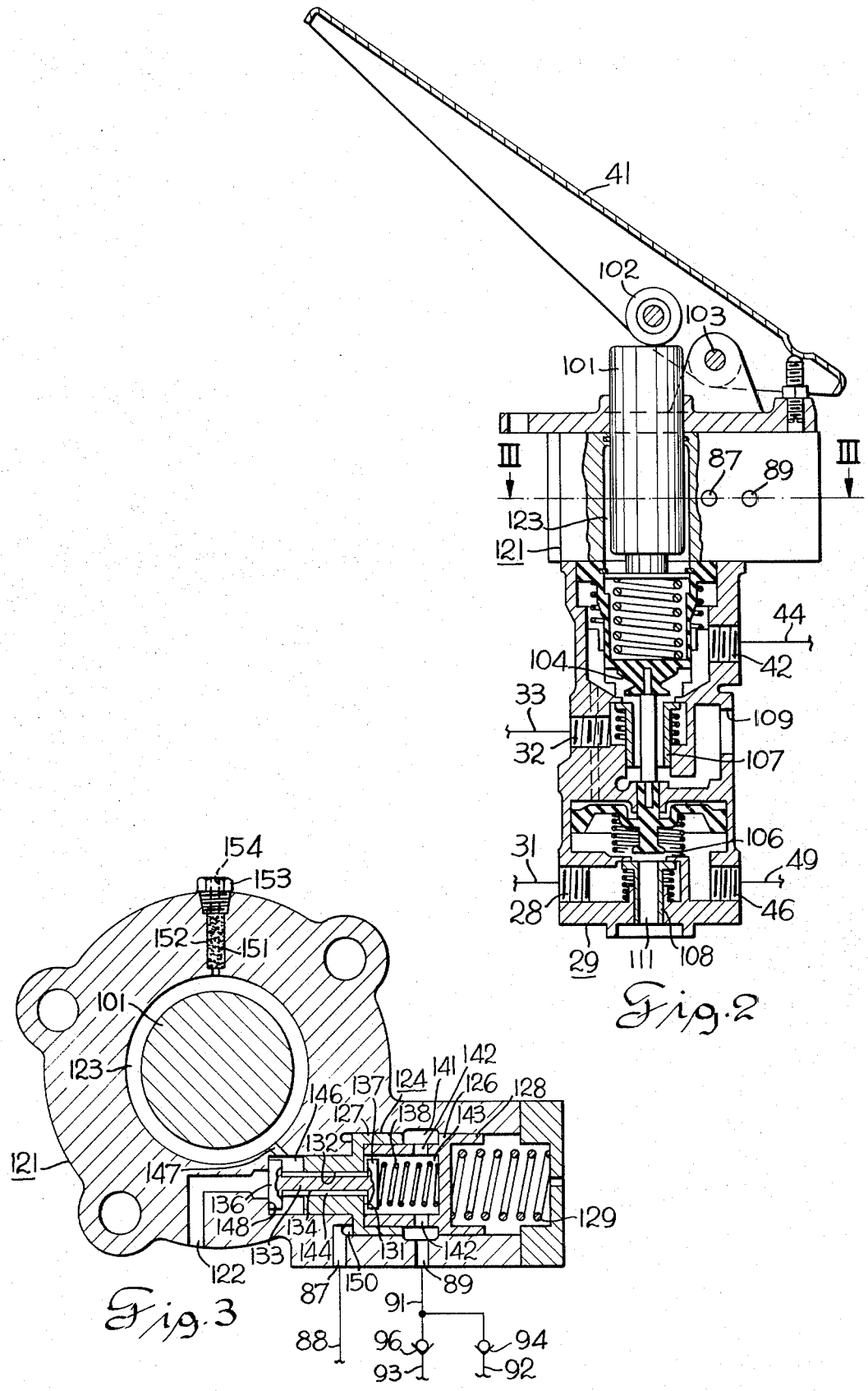

VEHICLE BRAKING SYSTEM WITH SPRING APPLIED PARKING BRAKE

BACKGROUND OF THE INVENTION

Heretofore various air brake systems have been used in off-highway vehicles such as tractor scrapers with varying degrees of success. Recent attention given to safety aspects of vehicular equipment including legislation at the federal and state level has given rise to the need for braking systems for off-highway equipment having additional safety features.

BRIEF DESCRIPTION OF THE INVENTION

An air compressor on the tractor supplies compressed air to a lead reservoir through a check valve which in turn supplies compressed air to a second reservoir on the tractor through a check valve preventing return flow. The two reservoirs on the tractor are independently connected to a dual brake valve having independent delivery ports, one of which is connected to the air brakes on the tractor, and the other of which is connected in control relationship to a relay valve on the trailer unit. The compressor on the tractor also supplies compressed air to a reservoir on the trailer by way of a nonreturn check valve; the reservoir on the trailer being connected to the aforementioned relay valve. The treadle operated brake valve also includes a protective or emergency feature whereby the brake valve is operated to apply the brakes if a reduced pressure is sensed at its control port. A spring operated parking brake is provided on the output shaft of the transmission and includes an air actuator for opposing the spring and releasing the parking brake which is controlled by a manually operated parking brake valve in a line between one of the reservoirs on the tractor and the air actuator. The control port of the protective section of the dual brake valve is connected to the delivery side of the manually operated brake valve. When the vehicle is operating normally with the parking brake released the service brakes will automatically be applied upon the air pressure in the main reservoir dropping to about 75 percent of normal operating pressure. Also, when the parking brake is normally moved to its exhaust position wherein the air actuator associated with the parking brake is exhausted to allow the spring to apply the parking brake, the control port will be connected to atmosphere and the dual brake valve will be actuated to apply the service brakes. An outflow restrictor is associated with the air actuator for the parking brake so as to obtain a delayed application of the parking brake to give the service brakes time to bring the vehicle to a standstill before the parking brake is applied. This delay prevents excessive wear and stressing of the parking brake and its associated components.

BRIEF DESCRIPTION OF THE DRAWINGS

One embodiment of the invention is shown in the attached drawings wherein:

FIG. 1 is a schematic view of a tractor-trailer braking system incorporating the present invention;

FIG. 2 is a vertical section through a dual brake valve used in the present invention; and FIG. 3 is a section taken along line III—III in FIG. 2.

DETAILED DESCRIPTION OF THE INVENTION

The components on the left side of dash line 11 in FIG. 1 are mounted on a tractor of a tractor-trailer type vehicle; and the components on the right side of the dash line 11 are on the trailer. This air brake system has particular application in off-highway equipment such as tractor scraper units. The tractor unit has an engine or other suitable power unit 12 and a transmission 13 with an output shaft 14 with which a parking brake 16 is associated. The power unit 12 drives an air compressor 17 which supplies compressed air to a lead or main reservoir 18 by way of a conduit 19 in which a check valve 21 is disposed to prevent return flow of air in event a rupture should occur between the compressor 17 and the check valve. A second reservoir 22 is connected in fluid receiving relationship to main reservoir 18 by way of a conduit 23 in which a check valve 24 is disposed to prevent air from flowing from the second reservoir 22 to the main reservoir 18. A governor 26 is provided for the air compressor 17 which senses pressure in the main reservoir 18, through a conduit 27. The main reservoir 18 supplies compressed air to reservoir port 28 of a treadle operated dual brake valve 29 by way of a conduit 31 and the second reservoir 22 supplies air to a reservoir port 32 by way of a conduit 33. The main reservoir 18 also supplies compressed air to a third reservoir 36 on the trailer by way of a conduit 37 in which a check valve 38 is placed to prevent reverse flow in the conduit 37 from the reservoir 36.

When the service brake valve 29 is operated by depressing treadle 41, the reservoir port 32 is connected to delivery port 42 to provide a compressed air control signal to a relay-emergency valve 43 on the trailer by way of conduit 44. Also, reservoir port 28 will deliver compressed air to delivery port 46 and air will be supplied to the pressure chambers 47 of the tractor brake actuators 48 by way of conduit 49 and branch conduits 51, 52. It should be understood that the rod 53 of the brake actuator 48 is connected to a tractor brake through suitable means, not shown. When the control pressure is supplied to the control port 56 of the relay-emergency valve 43, the latter will direct compressed air from reservoir 36 to the brake actuators 48 on the trailer by way of conduit 57, 58 and branch conduits 61, 62. An emergency control port 63 of relay valve 43 is connected to the main reservoir 18 by way of conduit 64 and conduit 37. When the pressure delivered to the emergency control port 63 falls below a predetermined level, the relay-emergency valve 43 will automatically connect the reservoir 36 to the brake actuators 48 and thereby apply the brakes on the wheels of the trailer.

The parking brake 16 is applied by a spring 66 which acts against a piston 67 of an air actuator 68. The piston 67 has a rod 69 rigidly secured thereto and has its free end pivotally connected to a parking brake applying lever 71. The air actuator 68 has a pressure chamber 72 defined by cylinder 73 and piston 67 which is connected to a manually operated parking brake valve 76 by a conduit 77. Included in the conduit 77 is a flow control mechanism 78 which includes parallel conduits 79, 81 with a restriction 82 built into conduit 79 and a check valve 83 built into conduit 81. Functionally, the flow control mechanism 78 operates as an orifice check valve and permits relatively uninhibited flow from the parking brake valve 76 to the pressure chamber 72 of the actuator through check valve 83. However, exhausting flow from the pressure chamber 72 must pass entirely through the restrictor 82 thereby effecting a slow exhausting and slow application of the parking brake by the spring 66. When the parking brake valve 76 is pulled upwardly to its exhaust position, the conduit 77 is connected to exhaust and the conduit 86 is blocked at the reservoir side of the parking brake valve.

As will be described more fully in reference to FIGS. 2 and 3, the upper part of the dual brake valve 29 includes an emergency or protection section having a control port 87 connected to the delivery or parking brake side of the parking brake 76 by a conduit 88. A reservoir port 89 of the protection section of the dual brake valve 29 is connected to reservoirs 18 and 22 by way of conduit 91 and branch conduits 92, 93. Branch conduits 92 and 93 contain check valves 94, 96 to prevent flow between the tanks 18 and 22.

Referring to FIG. 2, the dual brake valve 29 includes an operating plunger 101 which is operated by a roller 102 pivotally mounted on the treadle 41 which is pivotally connected to the valve by pivot pin 103. Downward movement of the plunger 101 causes a pair of shiftable valve components 104, 106 to be moved downwardly into seated relation with hollow valve seats 107, 108 to close off exhaust ports 109, 111 and unseat the seats 107, 108 to connect reservoir port 32 with delivery port 42 and reservoir port 28 with delivery port 46. In the illustrated condition of the dual brake valve, the air from reservoirs 18 and 22 is blocked and the delivery ports 42, 46 are connected to atmosphere thereby deactivating the brake actuators 48.

Referring also to FIG. 3, the dual brake valve includes automatic operating means in the form of a protective section 121 which includes a control port 87 to which conduit 88 is connected, a reservoir port 89 to which conduit 91 is connected and an exhaust port 122. The protective section 121 includes an air pressure chamber 123 which when pressurized will cause the valve elements 104, 106 to move downwardly to a brake applying position. Air pressure delivery to and exhaust of the pressure chamber 123 is controlled by valve means 124 which includes a two-piece valve member 126 having parts 127, 128 rigidly secured to one another by threads not shown. The valve means 124 is spring biased to the position shown by a coil spring 129. The valve part 127 includes a seat 131 and a bore 132 in which a grooved reduced diameter portion 133 of a valve element 134 is disposed. The valve element 134 includes a disk 136 at its left end which, as illustrated, closes the exhaust port 122 and a disk part 137 at its other end which is held off its seat in opposition to small coil spring 138. In the condition of the valve means 124 illustrated in FIG. 3, air pressure is delivered to the pressure chamber 123 by way of reservoir port 89, chamber 141, openings 142, interior chamber 143, grooves 144 in reduced diameter part 133, chamber 146 and passage 147. This condition of the valve means 124 will exist when the pressure at the control port 87 falls below a predetermined value. This will occur in two situations. First, it will occur when the manual parking brake valve 76 is in its parking brake release position shown in FIG. 1 and the pressure in the main reservoir 18 falls below a predetermined value (about 75 percent of normal operating pressure). It will also occur when the parking brake is in its exhaust position, inasmuch as the port 87 would then be connected to exhaust through the manually operated parking brake valve 76.

In normal operating conditions, the pressure in control port 87, and in the air pressure biasing means or pressure chamber 150, will be above the predetermined minimum for safe operation thereby causing the valve means 124 to move to the right causing the disk part 137 to seat upon the seat 131 and the disk part 136 to be unseated from its seat 148 thereby preventing flow of air from the reservoir port 89 to the pressure chamber 123 and connecting the pressure chamber 123 to exhaust through passage 147, chamber 146 and exhaust port 122. The protection section 121 includes a slow bleed-down mechanism in the form of a ceramic plug 151 maintained in bore 152 by a threaded component 153 having a central passage 154 therethrough. This slow bleed-down feature is particularly useful when it is desired to take the braking pressure off the service brakes and rely upon the parking brake 16 to hold the vehicle in place. This is particularly desirable in an air over hydraulic system wherein the air brake actuators 48 operate hydraulic master cylinders. In some air over hydraulic systems the seal components of the hydraulic brake system may become extruded if maintained in a brake applied condition by the air actuators 48 for an extended period of time.

The emergency relay valve 43 may be one of several commercially available types or may be as shown in FIG. 5 of U.S. Pat. No. 3,115,371. The dual brake actuator with its protective section may be type DAA sold by Bendix-Westinghouse Automotive Air Brake Company.

OPERATION

When the operator desires to park the vehicle and apply the parking brakes, he will normally bring the vehicle to a standstill and then place the manual parking brake valve 76 in its exhaust position. This exhausts the pressure chamber 72 of the parking brake actuator 68 and also causes the service brakes to be applied through operation of the protective section 121 of the dual brake valve. After a predetermined period of time the air pressure in chamber 123 of the protective section 121 will be bled off by the bleed means in the form of ceramic plug 151. This, of course, bleeds down reservoirs 18 and 22. When the vehicle is put back in operation, the parking brake will remain applied by spring 66 until the operator moves the parking brake valve 76 to its air delivery position shown in FIG. 1 and the system pressure is at least 75 percent of normal.

If the pressure in the main reservoir 18 should fail, the reduced pressure in the main reservoir will be sensed at the control port 87 of the protective section 121 of the dual valve 29 and the dual brake valve will be operated and air from reservoir 22 will operate the tractor brake actuators 48. The reservoir 22 will also deliver air pressure to control port 56 of the relay valve 43 causing the trailer brakes to be applied by effecting delivery of air to the trailer brake actuators 48 from reservoir 36. Whatever air pressure remains in main reservoir 18 will be connected to the brake actuators 48 on the tractor. Also, if the air pressure drops sufficiently in reservoir 18, the spring 66 of the parking brake will overcome the force exerted by the air in chamber 72 and apply the parking brake.

When the operator decides to park the vehicle and apply the parking brake, if by chance he moves the parking brake control valve 76 to its exhaust position in which the parking brake is applied before the vehicle has been brought to a standstill, the service brakes will immediately be applied through operation of the protective section 121 before the parking brake 16 is applied because the restrictor 82 in the parking brake actuator conduit 77 will provide a delay in the application of the parking brake 16 by the spring 66.

From the foregoing description it is apparent that a novel service and parking brake system has been provided to achieve safe vehicle operation with a minimum of components.

The embodiments of the invention in which an exclusive property or privilege is claimed are defined as follows:

1. In an air brake system for a vehicle including an air compressor, the combination comprising:
  an air brake actuator,
  a main air reservoir connected in air receiving relation with said compressor,
  a manually operated service brake valve connected in air receiving relation to said main air reservoir and in air delivery relationship to said brake actuator and having a braking and an exhaust position,
  a parking brake mechanism including
    a brake,
    a spring connected to and operable to apply said brake, and
    an air actuator operable to release said parking brake,
  a manually operable parking brake valve connected in air receiving relation to said main reservoir and in air delivery relation to said air actuator and having a first position wherein said main reservoir is connected to said air actuator to release said parking brake and a second position wherein said air actuator is exhausted,
  flow restricting means operatively associated with said actuator whereby when said parking valve is in its second position said actuator is slowly exhausted to provide slow application of said parking brake by said spring, and
  operating means automatically placing said service brake valve in its braking position when said parking brake valve is in its second position.

2. The invention of claim 1 wherein the flow of air from said parking brake valve to said actuator is substantially free of restriction and wherein said flow restricting means delays application of said parking brake until after said service brakes are applied when said parking brake valve is moved to its second position.

3. The invention of claim 2 wherein said vehicle is a tractor and trailer combination, said brake actuator is a tractor brake actuator and said service brake actuator is a dual brake actuator and further comprising a trailer brake actuator, a second reservoir, means connecting said main reservoir in air delivery relation to said second reservoir including a check valve, conduit means connecting said second reservoir and said dual brake actuator, and means operatively connecting said dual brake valve in controlling relation to said trailer brake actuator.

4. The invention in claim 3 and further comprising a third reservoir on said trailer, means connecting said third reservoir in air receiving relation to one of said main and second reservoirs through a one way valve and a relay valve on said trailer connected in air receiving relation with said third reservoir, in air delivery relation to said trailer brake actuator and in controlled relation to said dual brake valve.

5. The invention of claim 4 and further comprising means operating said relay valve to actuate said trailer brake actuator when the air pressure upstream of said one way valve falls below a predetermined value.

6. The invention of claim 3 wherein said operating means includes an air pressure chamber, valve means controlling air supply to and exhaust of air from said chamber having a chamber exhaust position and a chamber pressurize position, air passage means connecting said valve to said second reservoir, means biasing said valve means to its chamber pressurize position wherein said second reservoir is connected to said chamber, and air pressure biasing means operatively associated with said valve means and connected in air receiving relationship to the air delivery side of said parking brake valve, said air pressure biasing means shifting said valve means to its chamber exhaust position when air pressure on the air delivery side of said brake valve exceeds a predetermined value.

* * * * *